April 18, 1961   M. J. DEIBEL   2,980,160
TIRE BUILDING DRUM
Filed May 8, 1956   2 Sheets-Sheet 1
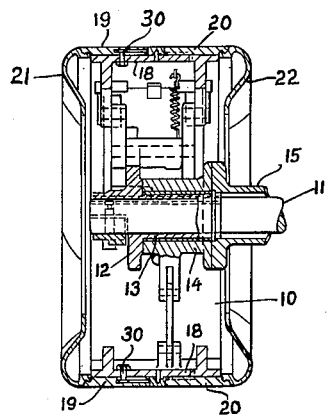
Fig.-1
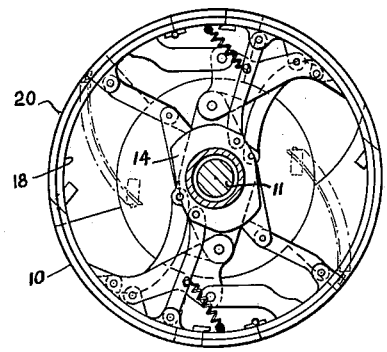
Fig.-2
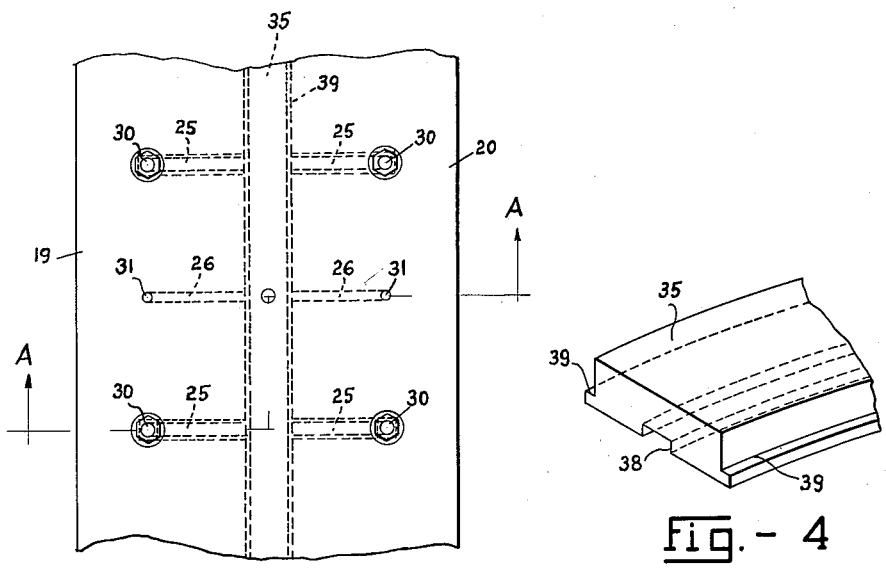
Fig.-3
Fig.-4
INVENTOR.
MASON J. DEIBEL
BY
Bates, Teare & McBean
ATTORNEYS April 18, 1961  M. J. DEIBEL  2,980,160
TIRE BUILDING DRUM Filed May 8, 1956  2 Sheets-Sheet 2

INVENTOR.
MASON J. DEIBEL
BY
Bates, Teare + McBean
ATTORNEYS

United States Patent Office 2,980,160
Patented Apr. 18, 1961

2,980,160
TIRE BUILDING DRUM

Mason J. Deibel, Cuyahoga Falls, Ohio, assignor to The Akron Standard Mold Company, Akron, Ohio, a corporation of Ohio Filed May 8, 1956, Ser. No. 583,431

4 Claims. (Cl. 154—9)

This invention relates to an improved tire building drum and more particularly relates to an improved arrangement for axially adjusting the width of the continuous tire building surface of the drum.

In normal practice, tire casings are built by assembling the component parts such as carcass plies, inextensible beads and the tread and side-wall portions in the form of a flat band on the continuous surface of a rotating building drum. The drum may be composed of a plurality of peripheral drum segments which are arranged for collapsible movement to reduce the drum diameter and permit removal of the raw tire band for subsequent shaping and vulcanizing operations. In order to adapt the drum for use in building tires of different sizes, various arrangements have been proposed for adjusting the width of the continuous building surface of the drum. One such arrangement utilizes a plurality of drum sections supported on a common axis and movable axially relative to each other to vary the overall width of the composite drum surface.

It is a principal object of this invention to provide an improved arrangement for axially adjusting a plurality of continuous surface drum sections without disturbing the continuity of the tire building surface.

Another object of this invention relates to the provision of a simplified and more economical arrangement for adjusting the axial width of a tire building drum without disturbing the continuity of the tire building surface.

The foregoing objectives are basically accomplished in accordance with this invention by providing a pair of drum sections which are adapted to be assembled on a supporting member for rotation on a common axis. Each drum section is adjustably secured on the supporting member by means of releasable clamping devices which also coact to guide the axial adjustment of the corresponding drum section. The continuity of the tire building surface is selectively maintained for different axially adjusted positions of the drum sections by inserting a spacer with marginal edges coacting in interlocking relation with adjacent edges of the drum sections. Suitable guides are provided on the supporting member to locate the spacer in a predetermined position between the drum sections. The axial width of the tire building drum may be readily adjusted without disturbing the continuous tire building surface by simply interchanging different size spacer members for differently axially adjusted positions of the drum sections.

In the drawings:

Fig. 1 is a side elevational sectional view of an expanded tire building drum;

Fig. 2 is an axial view of the expanded tire building drum;

Fig. 3 is an enlarged planular view of the underside of a portion of the tire building surface of the drum;

Fig. 4 is a fragmentary perspective view of a drum section spacer;

Figure 5:
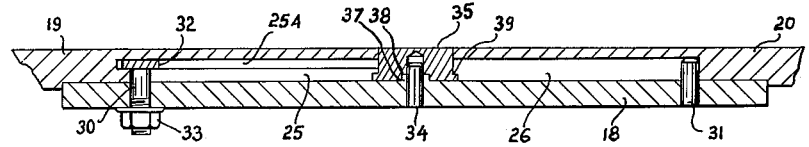
Fig. 5 and Fig. 6 are enlarged sectional views taken along the lines A—A in Fig. 3 to illustrate respectively different axially adjusted conditions of the tire building surface.
Figure 6:
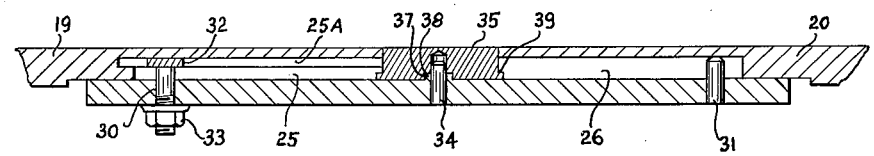

Referring now more particularly to Figs. 1 and 2 of the drawings, there is illustrated a drum 10 of the brake controlled variety which may be collapsed radially (as shown by the dotted lines in Fig. 2) by proper articulation of a plurality of linked drum segments which are arranged in suitable couples on opposite sides of the center of rotation so that when collapsed the rotating masses may be substantially in rotational balance in both the expanded and the collapsed condition. The collapsing mechanism in conventional and, not forming a part of this invention, is not shown or described in greater detail herein. Axial adjustment of the tire building surface of the drum may be applied to a non-collapsible as well as a collapsible tire building drum and the continuity of the surface maintained in a manner to be hereinafter more fully described.

In the drawings, the drum 10 is mounted on the horizontal rotary power shaft 11 of a tire building machine. The drum structure includes a supporting spider 12 composed of a pair of opposite segment supporting arms and a hub 13 fastened upon the shaft 11 together with a swing control collar 14 concentrically surrounding the spider hub and adapted for rotation with or relative to the spider hub. The swing control collar 14 can be retarded in the customary manner by the application of a brake band (not shown) to a sleeve 15 whose forward end flange is secured to the rear end of the collar together with linkage that connects the swing control collar with the several controllable drum segments. With this arrangement, the drum segments can be collapsed inwardly as shown by the dotted lines in Fig. 2 in the manner and for the purpose hereinbefore described.

In the collapsible form shown in the drawings, the middle portion of the tire band is formed about the substantially cylindrical segmental drum 10 each segment of which preferably includes a base supporting member 18 and, a pair of similar wing members 19 and 20 mounted for width-wise adjustment thereon and adapted to be secured thereto in a manner to be hereinafter more fully described. A pair of undercut shoulder forming and bead seating rings 21 and 22 of segmental construction are detachably mounted in the ends of the expanded drum body and are adapted to interlock therewith by suitable interlocking connections.

Referring now more particularly to Figs. 3 to 6 of the drawings, the wing members 19 and 20 form a pair of segmental drum sections mounted upon the base member 18 for width-wise adjustment and are each provided with under-cut key-way slots such as 25 and 26 for receiving and guiding respectively the shanks of suitable clamping bolts 30 and guide pins 31 carried by the base member. The clamping bolts 30 are each provided with a head 32 which seats in an enlarged portion 25A of the slot 25 while the bolt shank extends through a suitable aperture in the base member 18 and is secured by means of a suitable nut 33.

In the preferred form shown in the drawings, the wing members 19 and 20 are shown separated axially from each other by means of a spacing member 35 which is also in the form of a ring segment and which is guided into a center position on the base member 18 by means of a suitable dowel pin 34 or the like extending from the base member and adapted to enter an aperture in the undersurface of the spacer. The base member 18 has a raised central portion 37 which engages an undercut guide channel 38 in the spacer ring 35, and each spacer ring is also provided with flanged edges 39 which are adapted to be overlapped by complementary flanges on the inner edge of each of the wing members 19 and 20.

In operation, should it be desired to change the width of the tire building surface of the drum, it is simply a matter of turning the clamping bolt nuts 33 to release the clamping action of the bolt head 32 in the undercut keyway slot 25 and then adjusting each of the wing members 19 and 20 axially to a position that will accommodate the corresponding spacer member 35. Once the spacer member 35 has been properly located on the dowel pins 36, the wing members may be re-positioned with their flanges overlapping the edge flanges of the spacer member. The clamping bolts 30 are then tightened to secure the wing members and the spacer member together in fixed position on the base member. Because of the overlapping nature of the wing and spacer member flanges, the adjustment in width of the tire building surface may be accomplished without disturbing the smooth continuity of that surface.

Figure 7:
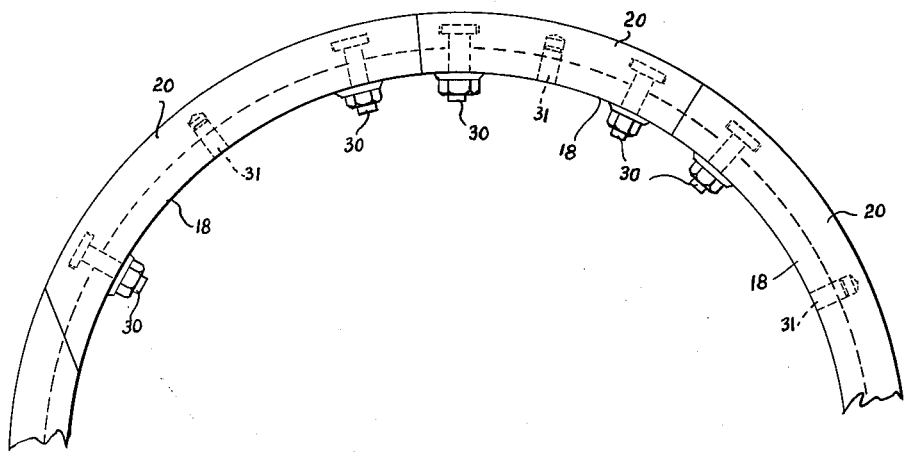
Fig. 7 is an enlarged fragmentary edge view of a segmental portion of a drum section.

As best shown in Figs. 3 and 7 of the drawings, each of the segmental wing members 19 and 20 accommodate at least a pair of circumferentially spaced clamping bolts 30 and an intermediately located guide pin 31 to insure at all times the proper location of each wing member relative to the other and the spacer ring on the supporting base member.

With this improved arrangement, the tire building surface of the drum may be adjusted axially without disturbing the continuous tire building surface. The adjustment is simple and economical because of interlocking relationship between the wing and spacer members which provide a self-retaining feature and at the same time insures the continuity of tire building surface. The only adjustment necessary to effect the change is to release the clamping bolts and interchange the spacer members to accommodate the desired adjusted width of the tire building surface.

I have shown and described what I consider to be the preferred embodiment of my invention along with suggested modified forms, and it will be obvious to those skilled in the art that other changes may be made without departing from the scope of my invention as defined by the appended claims.

I claim:

1. A collapsible tire building drum comprising in combination, an annular base member having a plurality of relatively movable arcuate segments adapted to be assembled in end to end relation for rotation about a central axis, a pair of annular wing members each having a substantially continuous cylindrical surface and assembled in side by side axially adjustable relation on the base member to form a substantially continuous smooth tire building surface, each of said wing members including a plurality of independent arcuate segments disposed in end to end relation about the base member, guide means coacting between each base member segment and the corresponding wing member segments to locate and maintain the latter in predetermined circumferential position on the base member, releasable clamping means coacting between each base member segment and the corresponding segments of each wing member to secure the wing members in any selected axial position thereon, and interchangeable segmental spacer means supported on and engaging the base member and coacting in interlocking relation between the wing members on the base member to maintain a substantially continuous smooth tire building surface for any axially extended position of the wing members, said interlocking relation comprising a continuous laterally projecting flange on each of the side edges of said segments of said spacer means disposed in underlying engaged relation with a single laterally projecting overlapping flange on the inner edge of the corresponding segment of each wing member whereby the outer arcuate faces of said spacer segments and said wing member segments provide a substantially continuous smooth tire building surface, said flanges on said spacer segments engaging said base member whereby the clamping force at the inner edges of said wing member segments due to said clamping means is applied to said spacer segments and thence directly to said base member through said flanges of said spacer segments, and guide means coacting between said base member and each of said spacer segments to maintain the latter in predetermined circumferential position on said base member, said releasable clamping means including a headed bolt carried by each base member segment with the bolt shank and head extending outwardly into the path of the corresponding wing member segment, each wing member segment having an axially extending undercut slot in its inner surface receiving and being selectively engaged by the corresponding bolt head, and threaded means coacting between each base member segment and the corresponding bolt shank to draw the bolt head towards the respective base member segment and thereby clamp the corresponding wing member segment in fixed position thereon.

2. A collapsible tire building drum comprising in combination, an annular base member having a plurality of relatively movable arcuate segments adapted to be assembled in end-to-end relation for rotation as a unit about a central axis, a pair of annular wing members each having a substantially continuous cylindrical surface assembled in side-by-side axially adjustable relation on the base member to form a substantially continuous smooth tire building surface, each of said wing members including a plurality of independent arcuate segments adapted to be disposed in end-to-end relation about the base member to form said cylindrical surface, guide means coacting between each base member segment and the corresponding wing member segments to locate and maintain the latter in predetermined circumferential position on the base member, releasable clamping means coacting in engaged relation between each base member segment and the corresponding segments of said wing members to secure the wing members in selected axial positions on said base member, and interchangeable annular segmental spacer means supported on and engaging the base member and coacting in interlocking relation with the wing members and between the latter, to maintain a substantially continuous smooth tire building surface for predetermined axially extended positions of the wing members, said interlocking relation comprising a continuous laterally projecting flange on each of the side edges of said segments of said spacer means disposed in underlying engaged relation with a laterally projecting overlapping flange on the inner edges of the corresponding segments of the wing members whereby the outer arcuate faces of said wing and spacer segments provide a substantially continuous smooth tire building surface, said flanges on said spacer segments engaging said base member whereby the clamping force at the inner edges of said wing members due to said clamping means is applied to said spacer segments and thence directly to said base member through said flanges of said spacer segments, said guide means including a guide pin extending outwardly from each base member segment into the path of the corresponding wing member segment and each wing member segment having an axially extending slot in its inner surface receiving and adapted to be guided by the corresponding guide pin in any axially adjusted position of the wing member segment.

3. A collapsible tire building drum comprising in combination, an annular base member having a plurality of relatively movable arcuate segments adapted to be assembled in end-to-end relation for rotation as a unit about a central axis, a pair of annular wing members assembled in side-by-side axially adjustable relation on said base member to form a substantially continuous tire building surface, each of said wing members including a plurality of independent arcuate segments adapted to be disposed in end-to-end relation about said base member, releasable clamping means coacting between said base member and each of said wing members to secure said wing members in any selected axial position thereon, said clamping means including a headed bolt member carried by each of the base member segments adjacent each outer edge of the respective base segment with the bolt shank and head extending outwardly into the path of the respective wing member segment, each of said wing member segments having an axially extending undercut slot in its inner face receiving and being selectively engaged by the bolt head, and means coacting between the base member segment and the respective bolt shank to draw the bolt head toward the base member segment and thereby clamp the wing member segments in fixed position thereon, a plurality of arcuate spacer members removably inserted on said base member in engaged supported relation therewith and between said wing members to maintain a substantially continuous tire building surface for predetermined axially extended positions of said wing members, said spacer members being adapted to be assembled in end-to-end relation on said base member to provide a spacer assembly of annular configuration, and interlocking means on said spacer members and said wing members coacting in engaged relation to provide a self-retaining action for holding said spacer members in operative condition on said base member, said interlocking means comprising a single laterally projecting integral flange on each of the side edges of each spacer member disposed in underlying engaged relation with a single laterally projecting integral flange on the inner side of the respective of said wing members whereby the outer arcuate faces of said wing and spacer members provide a substantially continuous tire building surface, said flanges on said spacer members engaging said base member whereby the clamping force at the inner edges of said wing members due to said clamping means is applied to said spacer members and thence directly to said base member through said spacer member flanges.

4. A collapsible tire building drum in accordance with claim 3 wherein a portion of said bolt shank is exteriorly threaded and said means coacting between the base member segment and the respective bolt shank comprises an internally threaded element, such as a nut, coacting in threaded engagement with the threaded portion of the respective bolt shank.

References Cited in the file of this patent
UNITED STATES PATENTS

| | | |
|---|---|---|
| 1,558,381 | Maranville | Oct. 20, 1925 |
| 1,637,195 | Kuhn | July 26, 1927 |
| 1,705,219 | Jenkinson | Mar. 12, 1929 |
| 1,896,214 | Bostwick | Feb. 7, 1933 |
| 1,946,449 | Williams | Feb. 6, 1934 |
| 2,039,531 | Heston | May 5, 1936 |
| 2,325,001 | McLaughlin | July 20, 1943 |
| 2,353,767 | Schnedarek | July 18, 1944 |
| 2,413,445 | Freeman et al. | Dec. 31, 1946 |
| 2,603,580 | DiCicco et al. | July 15, 1952 |
| 2,603,581 | Ericson et al. | July 15, 1952 |
| 2,614,057 | Erickson et al. | Oct. 14, 1952 |
| 2,655,977 | Hodgkins | Oct. 20, 1953 |

FOREIGN PATENTS

| | | |
|---|---|---|
| 695,764 | France | Oct. 6, 1930 |
| 427,123 | Great Britain | Apr. 16, 1935 |